(12) United States Patent
Huang

(10) Patent No.: US 11,383,495 B2
(45) Date of Patent: Jul. 12, 2022

(54) ELASTIC SILICONE COTTON STRUCTURE AND PREPARATION METHOD THEREOF

(71) Applicant: Baikai (Shenzhen) New Materials Co., Ltd., Shenzhen (CN)

(72) Inventor: Zhongcheng Huang, Shenzhen (CN)

(73) Assignee: Baikai (Shenzhen) New Materials Co., Ltd., Shenzhen (CN)

( * ) Notice: Subject to any disclaimer, the term of this patent is extended or adjusted under 35 U.S.C. 154(b) by 22 days.

(21) Appl. No.: 16/897,242

(22) Filed: Jun. 9, 2020

(65) Prior Publication Data

US 2021/0354428 A1 Nov. 18, 2021

(30) Foreign Application Priority Data

May 14, 2020 (CN) .......................... 202010409105.8

(51) Int. Cl.
| | | |
|---|---|---|
| *B32B 25/10* | (2006.01) | |
| *B32B 5/02* | (2006.01) | |
| *B32B 5/24* | (2006.01) | |
| *B32B 5/26* | (2006.01) | |
| *B32B 7/12* | (2006.01) | |
| *B32B 25/20* | (2006.01) | |

(Continued)

(52) U.S. Cl.
CPC .............. *B32B 25/10* (2013.01); *B32B 5/022* (2013.01); *B32B 5/245* (2013.01); *B32B 5/26* (2013.01); *B32B 7/12* (2013.01); *B32B 25/20* (2013.01); *B32B 37/12* (2013.01); *B32B 38/0036* (2013.01); *B32B 2038/0076* (2013.01); *B32B 2255/02* (2013.01); *B32B 2255/26* (2013.01); *B32B 2260/021* (2013.01); *B32B 2260/048* (2013.01); *B32B 2262/062* (2013.01); *B32B 2319/00* (2013.01)

(58) Field of Classification Search
CPC ....... B32B 25/10; B32B 7/12; B32B 38/0036; B32B 5/022; B32B 5/245; B32B 5/26; B32B 25/20; B32B 37/12; B32B 2255/02; B32B 2262/062; B32B 2038/0076; B32B 2260/021; B32B 2260/048; B32B 2319/00; B32B 2255/26
See application file for complete search history.

(56) References Cited

FOREIGN PATENT DOCUMENTS

| CN | 104559195 A | * | 4/2015 |
|---|---|---|---|
| JP | 2017036557 A | * | 2/2017 |

* cited by examiner

*Primary Examiner* — Nathan L Van Sell
(74) *Attorney, Agent, or Firm* — Wang Law Firm, Inc.

(57) ABSTRACT

Disclosed are an elastic silicone cotton structure and its preparation method. The elastic silicone cotton structure includes a cotton body, a silicone nest body and at least one glue layer. The silicone nest body is embedded into the cotton body and extended to a surface of the cotton body; the silicone layer is bonded to an upper surface and/or a lower surface of the cotton body. The novel elastic silicone cotton structure and the silicone nest body embedded into the cotton body improve the softness, resilience, pressure resistance, supportability, toughness, and anti-deformation performance of the cotton body. The portion of the structure protruding from the surface of the cotton body can be bonded with the glue layer stably to further improve the interlayer stability of the elastic silicone cotton structure and the bonding stability with other materials and prevent interlayer separation, so that the structure has a high practical value.

7 Claims, 2 Drawing Sheets

(51) Int. Cl.
*B32B 37/12* (2006.01)
*B32B 38/00* (2006.01)

ELASTIC SILICONE COTTON STRUCTURE AND PREPARATION METHOD THEREOF

FIELD OF THE INVENTION

The present invention relates to the field of fabric bonding, and more particularly to an elastic silicone cotton structure and its preparation method.

BACKGROUND OF THE INVENTION

For the adhesion and connection between fabrics commercially available on the market, there is a conventional way of attaching two or more fabrics together by a glue or adhesive. However, the glue or adhesive will be aged and deteriorated after a long time of use, and thus leading to a layer separation between the two or more fabrics and affecting the normal adhesion, connection and use of the fabrics.

SUMMARY OF THE INVENTION

In view of the aforementioned drawbacks and deficiencies of the conventional fabric bonding, it is a primary objective of the present invention to provide a novel elastic silicone cotton structure having a silicone nest body embedded into a cotton body and protruded to a surface of the cotton body to improve the softness, resilience, pressure resistance, supportability, toughness, and anti-deformation-against-washing function of the cotton body, and a portion of the structure protrudes out from a surface of the cotton body, and the stickiness of the silicone is provided for bonding the glue layer stably to improve the interlayer stability of the elastic silicone cotton structure and the stability of bonding other materials, as well as preventing the occurrence of an interlayer separation, so that the invention has a high practical value.

Another objective of the present invention is to provide a preparation method of the elastic silicone cotton structure, and the method has the features of simple operation, convenient control, low production cost, and high product quality, so that the elastic silicone cotton structure so produced has stable performance and better softness, resilience, pressure resistance, supportability, toughness and anti-deformation-against-washing function, and this invention can be used for mass production.

A further objective of the present invention is to provide an application method of the elastic silicone cotton structure, and the method has the features of simple operation and convenient control, and the capability of attaching other materials with high interlayer stability and preventing the occurrence of an interlayer separation.

To achieve the aforementioned and other objectives, the present invention discloses an elastic silicone cotton structure comprising a cotton body, a silicone nest body and at least one glue layer, wherein the silicone nest body is embedded into the cotton body and protruded to a surface of the cotton body, and the silicone layer is bonded with an upper surface and/or a lower surface of the cotton body.

In the novel elastic silicone cotton structure of the present invention, there are gaps in the cotton body and on the surface of the cotton body, and the silicone nest body is embedded into the gaps of the cotton body, and the silicone nest body is made of silicone, so that the softness, resilience, pressure resistance, supportability, toughness and anti-deformation-against-washing function of the cotton body can be improved, and the portion protruding out from the surface of the cotton body can be bonded with the glue layer stably to improve the interlayer stability of the elastic silicone cotton structure and the stability of bonding other materials to prevent the occurrence of an interlayer separation, and thus the invention has a high practical value. Specifically, the silicone nest body is permeated from the liquid silicone rubber into the gaps of the cotton body and formed into a solid nest body after curing.

Preferably, there are two layers of glue layers, and the two glue layers are bonded with both upper and lower surfaces of the cotton body respectively, and both upper and lower ends of the silicone nest body have an upper protrusion and a lower protrusion respectively, and the upper protrusion and lower protrusion are protruded to the upper surface and the lower surface of the cotton body and embedded into the two glue layers respectively.

Preferably, each glue layer has a weight of 15-35 $g/m^2$; the cotton body is one selected from the group consisting of a fiber cotton body, a foam body, a latex cotton body, a sandwich cotton body, and an upright cotton body; the glue layer is one selected from the group consisting of a urea-formaldehyde resin adhesive layer, a polyvinyl acetate adhesive layer, a polyurethane adhesive layer, an epoxy adhesive layer, a polyacrylic adhesive layer, a polyester adhesive layer, a PUR hot-melt adhesive layer, a PA hot-melt adhesive layer, a TPE hot-melt adhesive layer, and a PES hot-melt adhesive layer.

The present invention strictly controls the thickness of the glue layer, so that the elastic silicone cotton structure so produced has a light texture and a capability of permeating sufficient liquid silicone rubber into the cotton body, and the whole elastic silicone cotton structure has better elasticity, softness, resilience, pressure resistance, supportability, toughness and anti-deformation performance, and can be bonded with other materials through the glue layer.

Wherein, the glue layer is one selected from the group consisting of a urea-formaldehyde resin adhesive, a polyvinyl acetate adhesive, a polyurethane adhesive, an epoxy adhesive, a polyacrylic resin adhesive, a polyester adhesive, a PUR hot-melt adhesive, a PA hot-melt adhesive, a TPE hot-melt adhesive, and a PES hot-melt adhesive, and the aforementioned adhesives have a high bonding strength so that they can be bonded with the cotton body and other external material stably to prevent the occurrence of an interlayer separation. Wherein, the mechanism of action of the PUR hot-melt adhesive relates to the reaction of the polyurethane prepolymer with the moisture in air, and the formation of a stable chemical structure by the curing and crosslinking processes, so that the elastic silicone cotton body structure of the invention has a stable bonding effect.

Preferably, the silicone nest body is formed after being cured by the liquid silicone rubber and the liquid silicone rubber comprises the following raw materials in parts by weight:

| | |
|---|---|
| Cage-like octahydro silsesquioxane | (45~50 parts); |
| Methyl vinyl silicone rubber | (35~40 parts); |
| Hydrogen-containing silicone oil | (5~8 parts); |
| Cyclohexane | (3~8 parts); |
| White carbon black | (1~3 parts); |
| Modified filler | (5~8 parts); |
| Coupling agent | (2~6 parts); and |
| Toughener | (2~5 parts). |

The present invention prepares the liquid silicone rubber by the aforementioned raw materials and adopts a specific ratio of the cage-like octahydro silsesquioxane (T8H8) to the hydrogen-containing silicone oil, so that the liquid silicone rubber so produced has stronger bonding strength and better mobility and can be permeated from the surface into the interior of the cotton body, and a silicone nest body is formed after the silicone nest body is cured in the cotton body and coated onto the surface of the cotton body. The methyl vinyl silicone rubber and the hydrogen-containing silicone oil have hydrosilylation to form a cross-linked structure, wherein the methyl vinyl silicone rubber has a vinyl-group content of 0.03-0.10%, a molecular weight of 650,000-750,000; and the cyclohexane improves the dispersibility and compatibility of the materials including the cage-like octahydro silsesquioxane, hydrogen-containing silicone oil and methyl vinyl silicone rubber in the system and also improves the mobility of the liquid silicone rubber, so that they can be permeated through the surface and gaps of the cotton body into cotton body; wherein the toughener improves the softness/toughness and elasticity of the silicone nest body, so that the elastic silicone cotton structure so produced has better softness and elasticity and can be bonded with various different materials; and the modified filler can promote the liquid silicone rubber to be filled into the cotton body and the cavities formed on the surface of the cotton body, so that the liquid silicone rubber in a flowing state can be attached uniformly onto a surface of a fiber filament or foam air to form a silicone nest body; the white carbon black improves the strength and weather resistance of the silicone nest body, so that the silicone nest body will not be bent, broken or damaged easily; and the coupling agent improves the dispersibility and crosslinking between the materials.

Preferably, each part of the modified filler is prepared by the steps of:

S1: dispersing a filler into a mixed solvent A, heating the mixed solution to 68-70° C. after an ultrasonic dispersion, slowing dropping an aqueous acrylic acid solution into the mixed solution while stirring the mixed solution, adding an ammonia solution to adjust the pH value of the mixed solution to 5.5-6.0, and continuing stirring the mixed solution at a rotating speed of 600-800 rpm for 2-3 h to produce a prepolymer; and S2: adding methyl methacrylate monomer and 1-((cyano-1-methylethyl)azo)formamide into the prepolymer obtained from Step S1, adding the ammonia solution to the pH value to 5.3-5.8, stirring the mixed solution at 85-88° C. for 3-4 h, washing the mixed solution by a filtered deionized water, and baking and drying the mixed solution to produce a modified filler.

In the step S1, the mixed solvent A is preferably a mixture composed of ethanol and isopropanol in a weight ratio of 2-3:2, and the aqueous acrylic acid solution is composed of acrylic acid and water in a weight ratio of 2-6:60. In the step S2, the prepolymer, methyl methacrylate monomer and 1-((cyano-1-methylethyl)azo)formamide have a mixture proportion by weight of 12-18:3:1.

In the step S1, the filler, the mixed solvent A and the aqueous acrylic acid solution preferably have a mixture proportion by weight of 2-4:55:1; the ultrasonic dispersion has an ultrasonic frequency of 15000-22000 Hz and a dispersion time of 20-25 min; and the filler is one selected from the group consisting of silicon dioxide, calcium carbonate and glass microsphere.

The present invention uses the acrylic acid and filler for coating modification to improve the dispersibility of the filler in the system and then grates the methyl methacrylate monomer to the surface of an acrylic acid cladding layer under the initiation action of the 1-((cyano-1-methylethyl) azo)formamide to improve the impact resistance of the filler and the softness and elasticity of the liquid silicone. Wherein, in the step S1, the filler is dispersed into a mixed solvent A, and the solubility and dispersibility of the filler are improved under the effect of ultrasound, and then the temperature is increased, and the acrylic acid solution is added to promote the acrylic acid to be covered onto the surface of the filler under an acidic condition. Since the acrylic acid is acidic and will weaken the reaction process, therefore the ammonia solution is used to control the pH value of the system to be weakly acidic and facilitate the proceeding of the reaction. In the step S2, the methyl methacrylate monomer is grafted to the surface to form filler-acrylic acid-PMMA composite particles, and the methyl methacrylate monomer is provided for improving the toughening effect of the filler and the impact resistance, so as to further improve the softness/toughness, impact and pressure resistance, supportability, and anti-deformation-against-washing function of the liquid silicone rubber in the cotton body, and improve the dispersibility of the filler in the liquid silicone rubber under the effect of the acrylic acid, so that the filler can be permeated with the uniform mobility of the liquid silicone rubber and attached into the gaps of the cotton body, and the liquid silicone rubber in a flowing state can be uniformly attached onto the surface of the fiber filament or foam air, and finally the solvent is evaporated at the temperature of 78-85° C. and processed by a drying process to produce a modified filler.

Preferably, each part of the coupling agent (in part by weight) comprises 2-3 parts of (3-aminopropyl)trimethoxysilane, 0.5-2 parts of (γ-mercaptopropyl)trimethoxysilane and 2-3 parts of isopropyl tri(dioctylpyrophosphate) titanate; the toughener is at least one selected from the group consisting of styreneic block copolymer, acrylonitrile butadiene styrene, glycidyl methacrylate grafted with ethylene-octene copolymer.

Preferably, the liquid silicone rubber is prepared by the steps of:

Step ①: mixing the cage-like octahydro silsesquioxane, hydrogen-containing silicone oil and two-thirds of the amount of cyclohexane according to the specified parts by weight, stirring the mixture uniformly, adding a toughener while stirring, and heating the mixture to 95-100° C., stirring the mixture for 1-2 h, heating the mixture again to 158-165° C., stirring the mixture 40-50 min, heating the mixture to 170° C., keeping the mixture at this temperature for 30-35 min, and finally cooling the mixture to room temperature to produce a mixture I;

Step ②: mixing the white carbon black, modified filler, the remaining cyclohexane and two-thirds of the amount of coupling agent according to the specified parts by weight, and stirring the mixture uniformly to produce a mixture II; and Step ③: adding the mixture I obtained from the Step ① and the mixture II obtained from the Step ② while stirring, and then adding the remaining coupling agent, heating the mixture to 105-110° C., stirring the mixture for 2-3 h, and then cooling the mixture to room temperature to produce a liquid silicone rubber.

The present invention prepares the liquid silicone rubber according to the aforementioned steps, so that the liquid silicone rubber so produced has better mobility and softness/toughness and can permeate and flow into the gaps of the cotton body, and the liquid silicone rubber in a flowing state can be uniformly adhered onto the surface of the fiber filament or foam air to form the silicone nest body; wherein the toughener is added into the silicone oil system in Step ① to improve the toughness and impact resistance of the silicone oil body, and the white carbon black, modified filler and coupling agent are pre-mixed in Step ②, and added when the mixture I is stirred in order to improve the dispersibility of the silicone oil body, and the coupling agent is provided for promoting the crosslinkability of the modified filler, white carbon black and silicone oil system to improve the softness/toughness, resilience, supportability, impact resistance and anti-deformation-against-washing function of the liquid silicone rubber, wherein most of the coupling agent is added in Step ②, so that during the process of adding it into the mixture II, the coupling agent can be dispersed uniformly, and the remaining coupling agent is added gradually in Step ③, so that the coupling agent can be dispersed uniformly in the silicone oil to improve the uniformity and density of the crosslink of the modified filler and the silicone oil body, and also improve the of the softness/toughness, resilience, supportability, impact resistance and anti-deformation-against-washing function of the liquid silicone rubber.

A platinum vulcanizing agent of 0.5% of the total consumption of the liquid silicone rubber is added before the liquid silicone rubber is coated onto the cotton body. It is noteworthy that the platinum vulcanizing agent is mixed before coating, so that the platinum vulcanizing agent can promote the hydrosilylation of the hydrogen-containing silicone oil with the cage-like octahydro silsesquioxane and the methyl vinyl silicone rubber to form a cross-linked structure.

Another objective of the present invention is to provide a preparation method of the elastic silicone cotton structure comprises the steps of:

Step A: preparing a cotton body, coating a liquid silicone rubber onto an upper surface and/or a lower surface of the cotton body, and then performing a baking and curing process to form a silicone nest body, and embedding the silicone nest body into the cotton body and protruding the silicone nest body to a surface of the cotton body to produce a composite layer; and Step B: coating an adhesive onto the composite layer surface obtained from the Step A to form a glue layer, so as to produce an elastic silicone cotton structure.

In the Step A, the coating method is preferably one selected from the group consisting of a spray coating, a scrap coating, a dip coating, a lifting-and-pulling coating, a roll coating, a spin coating, a flow coating, and a brush coating; the baking and curing process is carried out at the temperature of 80-100° C. for 8-180 s. Wherein, 0.5-1 part of platinum vulcanizing agent is added and mixed thoroughly before each part of the liquid silicone rubber is coated, and then coated onto a surface of the cotton body to promote hydrosilylation and form a stable cross-linked structure, so as to improve the curing/molding efficiency of the liquid silicone rubber and form a stable silicone nest body.

In the Step B, the coating method of the adhesive is preferably one selected from the group consisting of spray coating, scrap coating, dip coating, lifting-and-pulling coating, roll coating, spin coating, and flow coating.

The elastic silicone cotton structure preparation method of the present invention has the features of simple operation, convenient control, low production cost, and high product quality, and the liquid silicone rubber can be coated uniformly onto the surface of the cotton body by the aforementioned the coating methods and permeated into the cotton body to provide better softness, resilience, pressure resistance, supportability, toughness and non-deformability against water function of the silicone cotton and stable performance of the elastic silicone cotton structure so produced, so as to prevent the occurrence of an interlayer separation. In addition, this invention can be applied for mass production.

A further objective of the present invention is to provide an application method of the elastic silicone cotton structure comprises the steps of: forming an elastic silicone cotton structure after an adhesive is coated onto an upper surface and/or a lower surface of a cotton body, and then attaching a material onto a surface of the adhesive to produce an elastic silicone cotton fabric, wherein the material is one selected from the group consisting of fabric, foam, fiber cotton, latex cotton, sandwich cotton, and upright cotton.

In the present invention, the liquid silicone rubber is coated onto the upper surface and/or the lower surface of the cotton body to form a silicone nest body after the liquid silicone rubber is cured, and then an adhesive is coated on a surface of the silicone nest body and a material is attached onto the surface of the adhesive, and thermal curing, light curing or natural curing can be performed according to the type of the adhesive, so that an elastic silicone cotton fabric can be produced to achieve the effects of adhering different types of materials with the cotton body of the present invention and preventing the occurrence of an interlayer separation.

In summation, the present invention has the following advantageous effects: the novel elastic silicone cotton structure of the present invention have gaps in the cotton body and on the surface of the cotton body, and the silicone nest body is embedded into the gaps of the cotton body, wherein the silicone nest body is made of silicone, so that the softness, resilience, pressure resistance, supportability, toughness and anti-deformation-against-washing function of the cotton body can be improved, and the portion protruding out from the surface of the cotton body can be bonded with the glue layer stably to improve the interlayer stability of the elastic silicone cotton structure and the stability of bonding other materials to prevent the occurrence of an interlayer separation, and thus the invention has a high practical value.

Specifically, the silicone nest body is permeated from the liquid silicone rubber into the gaps of the cotton body and formed into a solid nest body after curing. When the liquid silicone rubber is permeated from the surface of the cotton body into the cotton body, the liquid silicone rubber flows along the fiber filament or foam pore of the cotton body from the outside to the inside to cover the surface of the fiber filament or the surface layer of the foam pore instead of being clogged inside the cotton body, so as to assure that the space between the fiber filaments or foam pores of the cotton body has an air passage to improve the softness/toughness of the fiber filament or foam pores of the cotton body and to improve the softness, resilience, pressure resistance, supportability, toughness, and anti-deformation-against-washing function of cotton body.

The preparation method of the elastic silicone cotton structure of the present invention has the features of simple operation, convenient control, low production cost, and high product quality, so that the elastic silicone cotton structure so produced has stable performance and good softness, resilience, pressure resistance, supportability, toughness and anti-deformation-against-washing function. This invention can be applied for mass production.

The application method of the elastic silicone cotton structure of the present invention has the features of simple operation, convenient control, and good capability of adhering with other materials with a high interlayer stability and preventing the occurrence of an interlayer separation.

Figure 1:
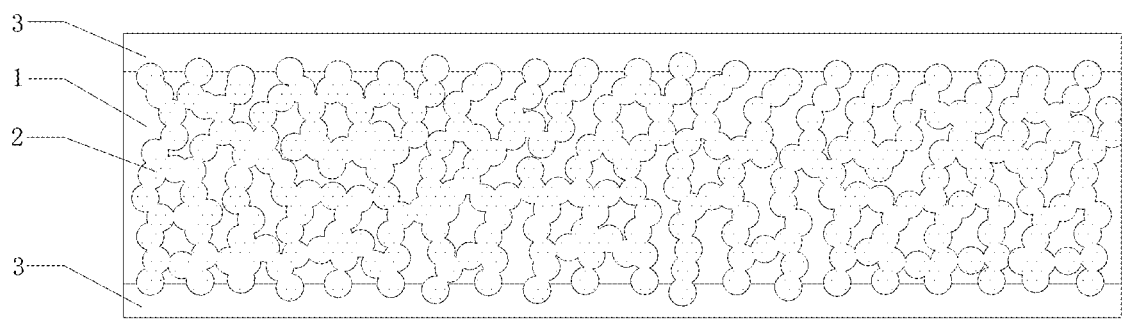
FIG. 1 is a partial cross-sectional view of the present invention.

Brief Description of Numerals Used in the Drawings: 1: 1: Cotton body; 2: Silicone nest body; 3: Glue layer.

DESCRIPTION OF THE PREFERRED EMBODIMENTS

The technical characteristics of the present invention will become apparent with the detailed description of preferred embodiments accompanied with the illustration of related drawings (FIGS. 1 and 2) as follows.

Embodiment 1

Figure 2:
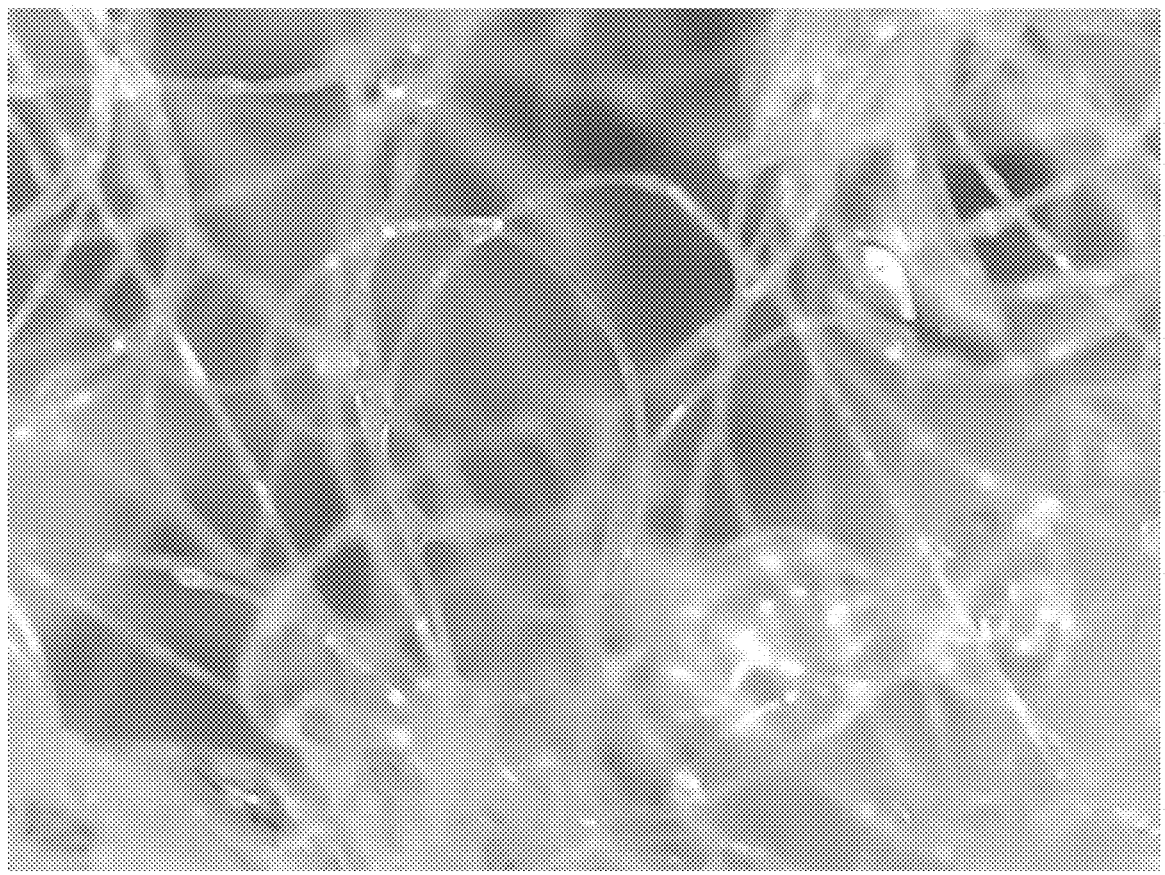
FIG. 2 is a blowup view of the interior of a cotton body (which is enlarged by a microscope) showing a liquid silicone rubber flowing along the surface of a fiber filament or a foam pore of the cotton body and a silicone nest body formed in the cotton body in accordance with the present invention.

In FIGS. 1-2, an elastic silicone cotton structure comprises a cotton body 1, a silicone nest body 2 and at least one glue layer 3, and the silicone nest body 2 is embedded into the cotton body 1 and protruded to a surface of the cotton body 1, and the silicone layer is bonded with an upper surface and a lower surface of the cotton body 1.

Each glue layer 3 has a weight of 15 g/m$^2$; the cotton body 1 is an upright cotton body; the glue layer 3 is a urea-formaldehyde resin adhesive layer selectively made of a urea-formaldehyde resin adhesive.

The silicone nest body 2 is formed after being cured by a liquid silicone rubber and the liquid silicone rubber comprises the following raw materials in parts by weight:

| | |
|---|---|
| Cage-like octahydro silsesquioxane | (45 parts); |
| Methyl vinyl silicone rubber | (35 parts); |
| Hydrogen-containing silicone oil | (5 parts); |
| Cyclohexane | (3 parts); |
| White carbon black | (1 part); |
| Modified filler | (5 parts); |
| Coupling agent | (2 parts); and |
| Toughener | (2 parts). |

Each part of the modified filler is prepared by the steps of:

S1: dispersing a filler into a mixed solvent A, heating the mixed solution to 68° C. after an ultrasonic dispersion, slowly dropping an aqueous acrylic acid solution into the mixed solution while stirring the mixed solution, adding an ammonia solution to adjust the pH value of the mixed solution to 5.83, and continuing stirring the mixed solution at a rotating speed of 600 rpm for 32 h to produce a prepolymer;

S2: adding methyl methacrylate monomer and 1-((cyano-1-methylethyl)azo)formamide into the prepolymer obtained from Step S1, adding the ammonia solution to the pH value to 5.3, stirring the mixed solution at 88° C. for 3-4 h, washing the mixed solution by a filtered deionized water, and baking and drying the mixed solution to produce a modified filler.

In the step S1, the mixed solvent A is preferably a mixture composed of ethanol and isopropanol in a weight ratio of 1.1, and the aqueous acrylic acid solution is composed of acrylic acid and water in a weight ratio of 2:60. In the step S2, the prepolymer, methyl methacrylate monomer and 1-((cyano-1-methylethyl)azo)formamide have a mixture proportion by weight of 12:3:1.

In the step S1, the mixed solvent A and the aqueous acrylic acid solution preferably have a mixture proportion by weight of 2:55:1; the ultrasonic dispersion has an ultrasonic frequency of 22000 Hz and a dispersion time of 20 min; and the filler is silicon dioxide.

Each part of the coupling agent in parts by weight comprises 2 parts of (3-aminopropyl)trimethoxysilane, 0.5 part of (γ-mercaptopropyl)trimethoxysilane and 2 parts of isopropyl tri(dioctylpyrophosphate) titanate; and the toughener is a styreneic block copolymer selected from Baling Petrochemical Brach's YH-501 ethylene-butadiene-styrene block copolymer.

The liquid silicone rubber is prepared by the steps of:

Step ①: mixing the cage-like octahydro silsesquioxane, hydrogen-containing silicone oil and two-thirds of the amount of cyclohexane according to the specified parts by weight, stirring the mixture uniformly, adding a toughener while stirring, and heating the mixture to 95° C., stirring the mixture for 2 h, heating the mixture again to 158° C., stirring the mixture 50 min, heating the mixture to 170° C., keeping the mixture at this temperature for 30 min, and finally cooling the mixture to room temperature to produce a mixture I;

Step ②: mixing the white carbon black, modified filler, the remaining cyclohexane and two-thirds of the amount of coupling agent according to the specified parts by weight, and stirring the mixture uniformly to produce a mixture II; and Step ③: adding the mixture I obtained from the Step ① and the mixture II obtained from the Step ② while stirring, and then adding the remaining coupling agent, heating the mixture to 105° C., stirring the mixture for 3 h, and then cooling the mixture to room temperature to produce a liquid silicone rubber.

A preparation method of the elastic silicone cotton structure comprises the steps of:

Step A: preparing a cotton body 1, coating a liquid silicone rubber onto an upper surface and a lower surface of the cotton body 1, and then performing a baking and curing process to form a silicone nest body 2, and embedding the silicone nest body 2 into the cotton body 1 and protruding the silicone nest body 2 to a surface of the cotton body 1 to produce a composite layer; and Step B: coating an adhesive onto the composite layer surface obtained from the Step A to form a glue layer 3, so as to produce an elastic silicone cotton structure.

In the step A, the coating method of the liquid silicone rubber is spray coating; the baking and curing process is carried out at the temperature of 80° C. for 180 s. In the Step B, the coating method of the adhesive is also spray coating.

An application method of the elastic silicone cotton structure comprises the steps of: forming an elastic silicone cotton structure after an adhesive is coated onto an upper surface and/or a lower surface of a cotton body 1, and then attaching a material onto a surface of the adhesive to produce an elastic silicone cotton fabric, wherein the material is fabric.

Embodiment 2

In FIG. 1, an elastic silicone cotton structure comprises a cotton body 1, a silicone nest body 2 and at least one glue layer 3, and the silicone nest body 2 is embedded into the cotton body 1 and protruded to a surface of the cotton body 1, and the silicone layer is bonded with an upper surface of the cotton body 1.

Each glue layer 3 has a weight of 20 g/m²; the cotton body 1 is a foam body; the glue layer 3 is a polyacrylic adhesive layer selectively made of a polyacrylic resin adhesive.

The silicone nest body 2 is formed after being cured by a liquid silicone rubber and the liquid silicone rubber comprises the following raw materials in parts by weight:

| | |
|---|---|
| Cage-like octahydro silsesquioxane | (46 parts); |
| Methyl vinyl silicone rubber | (36 parts); |
| Hydrogen-containing silicone oil | (6 parts); |
| Cyclohexane | (5 parts); |
| White carbon black | (1.5 part); |
| Modified filler | (6 parts); |
| Coupling agent | (3 parts); and |
| Toughener | (3 parts). |

Each part of the modified filler is prepared by the steps of:

S1: dispersing a filler into a mixed solvent A, heating the mixed solution to 68.5° C. after an ultrasonic dispersion, slowing dropping an aqueous acrylic acid solution into the mixed solution while stirring the mixed solution, adding an ammonia solution to adjust the pH value of the mixed solution to 5.5, and continuing stirring the mixed solution at a rotating speed of 650 rpm for 2.3 h to produce a prepolymer; and S2: adding methyl methacrylate monomer and 1-((cyano-1-methylethyl)azo)formamide into the prepolymer obtained from Step S1, adding the ammonia solution to the pH value to 5.5, stirring the mixed solution at 87° C. for 3.2 h, washing the mixed solution by a filtered deionized water, and baking and drying the mixed solution to produce a modified filler.

In the step S1, the mixed solvent A is preferably a mixture composed of ethanol and isopropanol in a weight ratio of 2.2:2, and the aqueous acrylic acid solution is composed of acrylic acid and water in a weight ratio of 3:60. In the step S2, the prepolymer, methyl methacrylate monomer and 1-((cyano-1-methylethyl)azo)formamide have a mixture proportion by weight of 13:3:1.

In the step S1, the filler, the mixed solvent A and the aqueous acrylic acid solution preferably have a mixture proportion by weight of 2.5:55:1; the ultrasonic dispersion has an ultrasonic frequency of 21000 Hz and a dispersion time of 21 min; and the filler is calcium carbonate.

Each part of the coupling agent in parts by weight comprises 2.2 parts of (3-aminopropyl)trimethoxysilane, 1.0 part of (γ-mercaptopropyl)trimethoxysilane and 2.2 parts of isopropyl tri(dioctylpyrophosphate) titanate; and the toughener is a styreneic block copolymer selected from Baling Petrochemical Brach's YH-502 ethylene-butadiene-styrene block copolymer.

The liquid silicone rubber is prepared by the steps of:

Step ①: mixing the cage-like octahydro silsesquioxane, hydrogen-containing silicone oil and two-thirds of the amount of cyclohexane according to the specified parts by weight, stirring the mixture uniformly, adding a toughener while stirring, and heating the mixture to 96° C., stirring the mixture for 1.8 h, heating the mixture again to 160° C., stirring the mixture 48 min, heating the mixture to 170° C., keeping the mixture at this temperature for 31 min, and finally cooling the mixture to room temperature to produce a mixture I;

Step ②: mixing the white carbon black, modified filler, the remaining cyclohexane and two-thirds of the amount of coupling agent according to the specified parts by weight, and stirring the mixture uniformly to produce a mixture II; and Step ③: adding the mixture I obtained from the Step ① and the mixture II obtained from the Step ② while stirring, and then adding the remaining coupling agent, heating the mixture to 106° C., stirring the mixture for 2.8 h, and then cooling the mixture to room temperature to produce a liquid silicone rubber.

A preparation method of the elastic silicone cotton structure comprises the steps of:

Step A: preparing a cotton body 1, coating a liquid silicone rubber onto an upper surface and a lower surface of the cotton body 1, and then performing a baking and curing process to form a silicone nest body 2, and embedding the silicone nest body 2 into the cotton body 1 and protruding the silicone nest body 2 to a surface of the cotton body 1 to produce a composite layer; and Step B: coating an adhesive onto the composite layer surface obtained from the Step A to form a glue layer 3, so as to produce an elastic silicone cotton structure.

In the step A, the coating method of the liquid silicone rubber is scrap coating, and the baking and curing process is carried out at the temperature of 85° C. for 150 s. In the Step B, the coating method of the adhesive is also scrap coating.

An application method of the elastic silicone cotton structure comprises the steps of: forming an elastic silicone cotton structure after an adhesive is coated onto an upper surface and/or a lower surface of a cotton body 1, and then attaching a material onto a surface of the adhesive to produce an elastic silicone cotton fabric, wherein the material is latex cotton.

Embodiment 3

In FIG. 1, an elastic silicone cotton structure comprises a cotton body 1, a silicone nest body 2 and at least one glue layer 3, and the silicone nest body 2 is embedded into the cotton body 1 and protruded to a surface of the cotton body 1, and the silicone layer is bonded with an upper surface and a lower surface of the cotton body 1.

Each glue layer 3 has a weight of 25 g/m²; the cotton body 1 is a fiber cotton body; the glue layer 3 is a PUR hot-melt adhesive layer selectively made of a PUR hot-melt adhesive.

The silicone nest body 2 is formed after being cured by a liquid silicone rubber and the liquid silicone rubber comprises the following raw materials in parts by weight:

| | |
|---|---|
| Cage-like octahydro silsesquioxane | (47 parts); |
| Methyl vinyl silicone rubber | (38 parts); |
| Hydrogen-containing silicone oil | (6.5 parts); |
| Cyclohexane | (6 parts); |
| White carbon black | (2 parts); |
| Modified filler | (6.5 parts); |
| Coupling agent | (4 parts); and |
| Toughener | (3.5 parts). |

Each part of the modified filler is prepared by the steps of:

S1: dispersing a filler into a mixed solvent A, heating the mixed solution to 69° C. after an ultrasonic dispersion, slowing dropping an aqueous acrylic acid solution into the mixed solution while stirring the mixed solution, adding an ammonia solution to adjust the pH value of the mixed solution to 5.6, and continuing stirring the mixed solution at a rotating speed of 700 rpm for 2.5 h to produce a prepolymer; and S2: adding methyl methacrylate monomer and 1-((cyano-1-methylethyl)azo)formamide into the prepolymer obtained from Step S1, adding the ammonia solution to the pH value to 5.6, stirring the mixed solution at 86.5° C. for 3.5 h, washing the mixed solution by a filtered deionized water, and baking and drying the mixed solution to produce a modified filler.

In the step S1, the mixed solvent A is preferably a mixture composed of ethanol and isopropanol in a weight ratio of 2.5:2, and the aqueous acrylic acid solution is composed of acrylic acid and water in a weight ratio of 4:60. In the step S2, the prepolymer, methyl methacrylate monomer and 1-((cyano-1-methylethyl)azo)formamide have a mixture proportion by weight of 15:3:1.

In the step S1, the filler, the mixed solvent A and the aqueous acrylic acid solution preferably have a mixture proportion by weight of 3:55:1; the ultrasonic dispersion has an ultrasonic frequency of 20000 Hz and a dispersion time of 22 min; and the filler is glass microsphere.

Each part of the coupling agent in parts by weight comprises 2.5 parts of (3-aminopropyl)trimethoxysilane, 1.3 parts of (γ-mercaptopropyl)trimethoxysilane and 2.5 parts of isopropyl tri(dioctylpyrophosphate) titanate; and the toughener is acrylonitrile butadiene styrene selected from Taiwan Chimei's PA-758 acrylonitrile butadiene styrene.

The liquid silicone rubber is prepared by the steps of:

Step ①: mixing the cage-like octahydro silsesquioxane, hydrogen-containing silicone oil and two-thirds of the amount of cyclohexane according to the specified parts by weight, stirring the mixture uniformly, adding a toughener while stirring, and heating the mixture to 98° C., stirring the mixture for 1.5 h, heating the mixture again to 162° C., stirring the mixture 45 min, heating the mixture to 170° C., keeping the mixture at this temperature for 32 min, and finally cooling the mixture to room temperature to produce a mixture I;

Step ②: mixing the white carbon black, modified filler, the remaining cyclohexane and two-thirds of the amount of coupling agent according to the specified parts by weight, and stirring the mixture uniformly to produce a mixture II;

Step ③: adding the mixture I obtained from the Step ① and the mixture II obtained from the Step ② while stirring, and then adding the remaining coupling agent, heating the mixture to 107° C., stirring the mixture for 2.5 h, and then cooling the mixture to room temperature to produce a liquid silicone rubber.

A preparation method of the elastic silicone cotton structure comprises the steps of:

Step A: preparing a cotton body 1, coating a liquid silicone rubber onto an upper surface and a lower surface of the cotton body 1, and then performing a baking and curing process to form a silicone nest body 2, and embedding the silicone nest body 2 into the cotton body 1 and protruding the silicone nest body 2 to a surface of the cotton body 1 to produce a composite layer; and Step B: coating an adhesive onto the composite layer surface obtained from the Step A to form a glue layer 3, so as to produce an elastic silicone cotton structure.

In the step A, the coating method of the liquid silicone rubber is dip coating, and the baking and curing process is carried out at the temperature of 90° C. for 100 s. In the Step B, the coating method of the adhesive is also dip coating.

An application method of the elastic silicone cotton structure comprises the steps of: forming an elastic silicone cotton structure after an adhesive is coated onto an upper surface and/or a lower surface of a cotton body 1, and then attaching a material onto a surface of the adhesive to produce an elastic silicone cotton fabric, wherein the material is fiber cotton.

Embodiment 4

In FIG. 1, an elastic silicone cotton structure comprises a cotton body 1, a silicone nest body 2 and at least one glue layer 3, and the silicone nest body 2 is embedded into the cotton body 1 and protruded to a surface of the cotton body 1, and the silicone layer is bonded with a lower surface of the cotton body 1.

Each glue layer 3 has a weight of 30 g/m$^2$; the cotton body 1 is a latex cotton body; the glue layer 3 is an epoxy adhesive layer selectively made of an epoxy adhesive.

The silicone nest body 2 is formed after being cured by a liquid silicone rubber and the liquid silicone rubber comprises the following raw materials in parts by weight:

| | |
|---|---|
| Cage-like octahydro silsesquioxane | (48 parts); |
| Methyl vinyl silicone rubber | (38 parts); |
| Hydrogen-containing silicone oil | (7 parts); |
| Cyclohexane | (7 parts); |
| White carbon black | (3 parts); |
| Modified filler | (8 parts); |
| Coupling agent | (6 parts); and |
| Toughener | (5 parts). |

Each part of the modified filler is prepared by the steps of:

S1: dispersing a filler into a mixed solvent A, heating the mixed solution to 69.5° C. after an ultrasonic dispersion, slowing dropping an aqueous acrylic acid solution into the mixed solution while stirring the mixed solution, adding an ammonia solution to adjust the pH value of the mixed solution to 5.7, and continuing stirring the mixed solution at a rotating speed of 750 rpm for 2.8 h to produce a prepolymer; and S2: adding methyl methacrylate monomer and 1-((cyano-1-methylethyl)azo)formamide into the prepolymer obtained from Step S1, adding the ammonia solution to the pH value to 5.7, stirring the mixed solution at 86° C. for 3.8 h, washing the mixed solution by a filtered deionized water, and baking and drying the mixed solution to produce a modified filler.

In the step S1, the mixed solvent A is preferably a mixture composed of ethanol and isopropanol in a weight ratio of 2.8:2, and the aqueous acrylic acid solution is composed of acrylic acid and water in a weight ratio of 5:60. In the step S2, the prepolymer, methyl methacrylate monomer and 1-((cyano-1-methylethyl)azo)formamide have a mixture proportion by weight of 16:3:1.

In the step S1, the filler, the mixed solvent A and the aqueous acrylic acid solution preferably have a mixture proportion by weight of 3.5:55:1; the ultrasonic dispersion has an ultrasonic frequency of 18000 Hz and a dispersion time of 23 min; and the filler is silicon dioxide.

Each part of the coupling agent in parts by weight comprises 2.8 parts of (3-aminopropyl)trimethoxysilane, 1.5 parts of (γ-mercaptopropyl)trimethoxysilane and 2.8 parts of isopropyl tri(dioctylpyrophosphate) titanate; and the toughener is acrylonitrile butadiene styrene selected from Formosa Chemicals & Fibre Corporation's AT5500 acrylonitrile butadiene styrene.

The liquid silicone rubber is prepared by the steps of:

Step ①: mixing the cage-like octahydro silsesquioxane, hydrogen-containing silicone oil and two-thirds of the amount of cyclohexane according to the specified parts by weight, stirring the mixture uniformly, adding a toughener while stirring, and heating the mixture to 99° C., stirring the mixture for 1.2 h, heating the mixture again to 163° C., stirring the mixture 42 min, heating the mixture to 170° C., keeping the mixture at this temperature for 33 min, and finally cooling the mixture to room temperature to produce a mixture I;

Step ②: mixing the white carbon black, modified filler, the remaining cyclohexane and two-thirds of the amount of coupling agent according to the specified parts by weight, and stirring the mixture uniformly to produce a mixture II; and Step ③: adding the mixture I obtained from the Step ① and the mixture II obtained from the Step ② while stirring, and then adding the remaining coupling agent, heating the mixture to 108° C., stirring the mixture for 2.2 h, and then cooling the mixture to room temperature to produce a liquid silicone rubber.

A preparation method of the elastic silicone cotton structure comprises the steps of:

Step A: preparing a cotton body 1, coating a liquid silicone rubber onto a lower surface of the cotton body 1, and then performing a baking and curing process to form a silicone nest body 2, and embedding the silicone nest body 2 into the cotton body 1 and protruding the silicone nest body 2 to a surface of the cotton body 1 to produce a composite layer; and Step B: coating an adhesive onto the composite layer surface obtained from the Step A to form a glue layer 3, so as to produce an elastic silicone cotton structure.

In the Step A, the coating method of the liquid silicone rubber is spin coating; and the baking and curing process is carried out at the temperature of 95° C. for 50 s. In the Step B, the coating method of the adhesive is also spin coating.

An application method of the elastic silicone cotton structure comprises the steps of: forming an elastic silicone cotton structure after an adhesive is coated onto an upper surface and/or a lower surface of a cotton body 1, and then attaching a material onto a surface of the adhesive to produce an elastic silicone cotton fabric, wherein the material is upright cotton.

Embodiment 5

In FIG. 1, an elastic silicone cotton structure comprises a cotton body 1, a silicone nest body 2 and at least one glue layer 3, wherein the silicone nest body 2 is embedded into the cotton body 1 and protruded to a surface of the cotton body 1, and the silicone layer is bonded with an upper surface and a lower surface of the cotton body 1.

Each glue layer 3 has a weight of 35 g/m$^2$; the cotton body 1 is a sandwich cotton body; the glue layer 3 is a polyvinyl acetate adhesive layer made of a polyvinyl acetate adhesive.

The silicone nest body 2 is formed after being cured by a liquid silicone rubber and the liquid silicone rubber comprises the following raw materials in parts by weight:

| | |
|---|---|
| Cage-like octahydro silsesquioxane | (50 parts); |
| Methyl vinyl silicone rubber | (40 parts); |
| Hydrogen-containing silicone oil | (5 parts); |
| Cyclohexane | (8 parts); |
| White carbon black | (3 parts); |
| Modified filler | (8 parts); |
| Coupling agent | (6 parts); and |
| Toughener | (5 parts). |

Each part of the modified filler is prepared by the steps of:

S1: dispersing a filler into a mixed solvent A, heating the mixed solution to 70° C. after an ultrasonic dispersion, slowing dropping an aqueous acrylic acid solution into the mixed solution while stirring the mixed solution, adding an ammonia solution to adjust the pH value of the mixed solution to 5.8, and continuing stirring the mixed solution at a rotating speed of 800 rpm for 3 h to produce a prepolymer; and S2: adding methyl methacrylate monomer and 1-((cyano-1-methylethyl)azo)formamide into the prepolymer obtained from Step S1, adding the ammonia solution to the pH value to 5.8, stirring the mixed solution at 85° C. for 4 h, washing the mixed solution by a filtered deionized water, and baking and drying the mixed solution to produce a modified filler.

In the step S1, the mixed solvent A is a mixture composed of ethanol and isopropanol in a weight ratio of 3:2, and aqueous acrylic acid solution is composed of acrylic acid and water in a weight ratio of 6:60. In the step S2, the prepolymer, methyl methacrylate monomer and 1-((cyano-1-methylethyl)azo)formamide have a mixture ratio by weight of 18:3:1.

In the step S1, the filler, the mixed solvent A and the aqueous acrylic acid solution have a mixture proportion by weight of 4:55:1; the ultrasonic dispersion has an ultrasonic frequency of 15000 Hz and a dispersion time of 25 min; and the filler is calcium carbonate.

Each part of the coupling agent in parts by weight comprises 3 parts of (3-aminopropyl)trimethoxysilane, 2 parts of (γ-mercaptopropyl)trimethoxysilane and 3 parts of isopropyl tri(dioctylpyrophosphate) titanate; the toughener is a glycidyl methacrylate grafted with ethylene-octene copolymer which is selected from Guangzhou Dongem Plastic Technology Company's DI-2901G glycidyl methacrylate grafted with ethylene-octene copolymer.

The liquid silicone rubber is prepared by the steps of:

Step ①: mixing the cage-like octahydro silsesquioxane, hydrogen-containing silicone oil and two-thirds of the amount of cyclohexane according to the specified parts by weight, stirring the mixture uniformly, adding a toughener while stirring, and heating the mixture to 100° C., stirring the mixture for 1 h, heating the mixture again to 165° C., stirring the mixture 40 min, heating the mixture to 170° C., keeping the mixture at this temperature for 35 min, and finally cooling the mixture to room temperature to produce a mixture I;

Step ②: mixing the white carbon black, modified filler, the remaining cyclohexane and two-thirds of the amount of coupling agent according to the specified parts by weight, and stirring the mixture uniformly to produce a mixture II; and Step ③: adding the mixture I obtained from the Step ① and the mixture II obtained from the Step ② while stirring, and then adding the remaining coupling agent, heating the mixture to 110° C., stirring the mixture for 2, and then cooling the mixture to room temperature to produce a liquid silicone rubber.

A preparation method of the elastic silicone cotton structure comprises the steps of:

Step A: preparing a cotton body 1, coating a liquid silicone rubber onto an upper surface and a lower surface of the cotton body 1, and then performing a baking and curing process to form a silicone nest body 2, and embedding the silicone nest body 2 into the cotton body 1 and protruding the silicone nest body 2 to a surface of the cotton body 1 to produce a composite layer; and Step B: coating an adhesive onto the composite layer surface obtained from the Step A to form a glue layer 3, so as to produce an elastic silicone cotton structure.

In In the Step A, the coating method of the liquid silicone rubber is brush coating; and the baking and curing process is carried out at the temperature of 100° C. for 8 s. In the Step B, the coating method of the adhesive is also brush coating.

An application method of the elastic silicone cotton structure comprises the steps of: forming an elastic silicone cotton structure after an adhesive is coated onto an upper surface and/or a lower surface of a cotton body 1, and then attaching a material onto a surface of the adhesive to produce an elastic silicone cotton fabric, wherein the material is foam.

Comparative Example 1

The differences between this Comparative Example and Embodiment 3 are described below:

The liquid silicone rubber comprises the following raw materials in parts by weight:

| | |
|---|---|
| Cage-like octahydro silsesquioxane | (47 parts); |
| Methyl vinyl silicone rubber | (38 parts); |
| Hydroxyl silicone oil | (6.5 parts); |
| Cyclohexane | (6 parts); |
| White carbon black | (2 parts); |
| Modified filler | (6.5 parts); |
| Coupling agent | (4 parts); and |
| Toughener | (3.5 parts). |

Comparative Example 2

The differences between this Comparative Example and Embodiment 3 are described below:

The liquid silicone rubber comprises the following raw materials in parts by weight:

| | |
|---|---|
| Cage-like octahydro silsesquioxane | (47 parts); |
| Methyl vinyl silicone rubber | (38 parts); |
| Hydrogen-containing silicone oil | (6.5 parts); |
| Cyclohexane | (6 parts); |
| White carbon black | (2 parts); |
| Filler | (6.5 parts); |
| Coupling agent | (4 parts); and |
| Toughener | (3.5 parts). |

The filler is a non-modified filler; and the filler is glass microsphere.

Comparative Example 3

The differences between this Comparative Example and Embodiment 3 are described below:

Each part of the modified filler is prepared by the steps of:

S1: dispersing a filler into a mixed solvent A, and producing a filler dispersion liquid after an ultrasonic dispersion; and S2: adding the filler dispersion liquid obtained from the step S1 into methyl methacrylate monomer and 1-((cyano-1-methylethyl)azo)formamide, adding ammonia solution to adjust the pH value to 5.6, stirring the mixed solution at 86.5° C. for 3.5 h, washing the mixed solution by a filtered deionized water, and baking and drying the mixed solution to produce a modified filler.

In the step S1, the mixed solvent A is a mixture of ethanol and isopropanol in a weight ratio of 2.5:2, and the filler and the mixed solvent A preferably have a mixture ratio by weight of 3:55:1; the ultrasonic dispersion has an ultrasonic frequency of 20000 Hz and a dispersion time of 22 min; and the filler is glass microsphere.

In the step S2, the filler dispersion liquid, methyl methacrylate monomer and 1-((cyano-1-methylethyl)azo)formamide have a mixture proportion by weight of 15:3:1.

Comparative Example 4

The differences between this Comparative Example and Embodiment 3 are described below:

Each part of the modified filler is prepared by the steps of:

dispersing the filler into a mixed solvent A, heating the mixed solution up to 69° C. after an ultrasonic dispersion, slowly dropping an aqueous acrylic acid solution into the mixed solution, while stirring the mixed solution, and dropping an ammonia solution to adjust the pH value to a range of 5.6, continuing stirring the mixed solution at a rotating speed of 700 rpm for 2.5 h and washing the mixed solution by a filtered deionized water to produce a modified filler.

The mixed solvent A is a mixture of ethanol and isopropanol in a weight ratio of 2.5:2, and the aqueous acrylic acid solution is composed of acrylic acid and water in a weight ratio of 4:60. In the step S1, the filler, the mixed solvent A and the aqueous acrylic acid solution have a mixture proportion by weight of 3:55:1, and the ultrasonic dispersion has an ultrasonic frequency of 20000 Hz and a dispersion time of 22 min; and the filler is glass microsphere.

The test results of the performance on the resilience, bending strength impact strength, and surface self-adhesiveness of the cotton body 1 with the silicone nest body 2 in accordance with Embodiment 3 and Comparative Examples 1-4 are listed in the following table:

| | Resilience percentage/% | Bending strength/MPa | Impact strength/MPa | Surface self-adhesiveness/MPa | Permeability (Steam temperature at upper surface of the elastic silicone cotton structure upper surface)/° C. |
|---|---|---|---|---|---|
| Embodiment 3 | 96.8 | 115.6 | 6.6 | 1.3 | 113.2 |
| Comparative Example 1 | 88.5 | 92.8 | 5.5 | 0.7 | 111.5 |
| Comparative Example 2 | 90.4 | 104.2 | 5.9 | 0.9 | 110.2 |
| Comparative Example 3 | 91.2 | 108.1 | 5.9 | 1.0 | 111.8 |

-continued

|  | Resilience percentage/ % | Bending strength/ MPa | Impact strength/ MPa | Surface self-adhesiveness/ MPa | Permeability (Steam temperature at upper surface of the elastic silicone cotton structure upper surface)/° C. |
|---|---|---|---|---|---|
| Comparative Example 4 | 91.8 | 109.5 | 6.0 | 0.9 | 111.6 |

The resilience is tested based on the standard "FZ/T 70006-2004 Stretch and Recovery Testing Method for Knits; the surface self-adhesiveness is tested based on the standard "GB/T 10247-2008 Viscosity Measurement Method"; the bending strength is tested based on the standard "GB/T 9341-2000 Plastics-Determination of Flexural Properties"; and the impact strength is tested based on the standard "GB/T 1843-2008 Plastics-Determination of izod impact strength".

In the permeability testing method, the elastic silicone cotton structure is placed horizontally, and steam is sprayed continuously at the elastic silicone cotton structure from bottom to top (wherein the temperature of steam at the lower surface of the elastic silicone cotton structure is 115° C.), and the speed of the water vapor or water drop at the upper surface of the elastic silicone cotton structure is observed, and the steam temperature of the upper surface of the elastic silicone cotton structure is measured.

From the data above and comparison, we learn that the Comparative Example 1 uses the same quantity of hydroxyl silicone oil to substitute the hydrogen-containing silicone oil, and the resilience, bending strength, impact strength and surface self-adhesiveness of the cotton body 1 embedded with the silicone nest body 2 are dropped significantly, and thus showing that specific ratio of the cage-like octahydro silsesquioxane to the hydrogen-containing silicone oil used in the present invention makes the liquid silicone rubber so produced to have a greater bonding strength and a better mobility and allows the liquid silicone rubber to permeate from the surface of the cotton body 1 into the cotton body 1, so that the silicone nest body 2 is formed in the cotton body 1 and on the coated surface of the cotton body to improve the elasticity, softness, resilience, pressure resistance, supportability, toughness, and surface adhesiveness of the cotton body 1, and the cotton body 1 can be adhered with various types of adhesives for attaching other materials.

The filler of the Comparative Example 2 has not been processed with modification; the filter of the Comparative Example 3 directly grafts the methyl methacrylate monomer to the surface of the filler and does not use acrylic acid for the surface modification; the filter of the Comparative Example 4 just performs a surface modification by acrylic acid, so that the resilience, bending strength, impact strength and surface self-adhesiveness of the cotton body 1 embedded with the silicone nest body 2 are dropped significantly, and thus showing that the present invention uses acrylic acid for the surface modification of the filler to improve the dispersibility of the filler in the system, and then the methyl methacrylate monomer is grafted to a surface of the acrylic acid cladding layer under the initiation effect of the 1-((cyano-1-methylethyl)azo)formamide to improve the impact resistance of the filler and the softness and elasticity of the liquid silicone, and filler-acrylic acid-PMMA composite particles are formed to improve the softness/toughness, impact and pressure resistance, supportability and resilience of the liquid silicone rubber in the cotton body 1.

While the invention has been described by means of specific embodiments, numerous modifications and variations could be made thereto by those skilled in the art without departing from the scope and spirit of the invention as set forth in the claims.

What is claimed is:

1. An elastic silicone cotton structure, comprising: a cotton body, a silicone nest body, and at least one glue layer, and the silicone nest body being embedded into the cotton body and protruded from a surface of the cotton body, and the glue layer being bonded with an upper surface and/or a lower surface of the cotton body;
    wherein the silicone nest body is formed after being cured by a liquid silicone rubber, and the liquid silicone rubber comprises the following raw materials in parts by weight:
    45-50 parts of cage-like octahydro silsesquioxane;
    35-40 parts of methyl vinyl silicone rubber;
    5-8 parts of hydrogen-containing silicone oil;
    3-8 parts of cyclohexane;
    1-3 parts of white carbon black;
    5-8 parts of a modified filler;
    2-6 parts of a coupling agent; and
    2-5 parts of a toughener.

2. The elastic silicone cotton structure as claimed in claim 1, wherein each glue layer has a weight of 15-35 g/m$^2$; the cotton body is one selected from the group consisting of a fiber cotton body, a foam body, a latex cotton body, and a sandwich cotton body; and the glue layer is one selected from the group consisting of a urea-formaldehyde resin layer, a polyvinyl acetate adhesive layer, a polyurethane adhesive layer, an epoxy adhesive layer, a polyacrylic adhesive layer, a polyester adhesive layer, a PUR hot-melt adhesive layer, a PA hot-melt adhesive layer, a TPE hot-melt adhesive layer, and a PES hot-melt adhesive layer.

3. The elastic silicone cotton structure as claimed in claim 1, wherein each part of the modified filler is prepared by the steps of:
    S1: dispersing the filler into a mixed solvent A, heating the mixed solution up to 68-70° C. after an ultrasonic dispersion, slowing dropping an aqueous acrylic acid solution into the mixed solution, while stirring the mixed solution, and dropping an ammonia solution to adjust the pH value to a range of 5.3-5.8, and continuing stirring the mixed solution at a rotating speed of 600-800 rpm for 2-3 h to produce a prepolymer; and
    S2: adding a methyl methacrylate monomer and 1-((cyano-1-methylethyl)azo)formamide into the prepolymer obtained from the step S1, dropping the ammonia solution to adjust the pH value to a range of 5.3-5.8, and stirring the mixed solution at 85-88° C. for 3-4 h, and then suction filtering the mixed solution and washing the mixed solution by deionized water to produce a modified filler.

4. The elastic silicone cotton structure as claimed in claim 3, wherein the mixed solvent A used in the step S1 is a mixture composed of ethanol and isopropanol in a weight ratio of 2-3:2, and the aqueous acrylic acid solution is composed of acrylic acid and water in a weight ratio of 2-6:60; and the prepolymer, methyl methacrylate monomer and 1-((cyano-1-methylethyl)azo)formamide in the Step S2 have a mix proportion by weight equal to 12-18:3:1.

5. The elastic silicone cotton structure as claimed in claim 3, wherein the filler, the mixed solvent A and the aqueous acrylic acid solution in the Step S1 have a mixture proportion by weight of 2-4:55:1, and the ultrasonic dispersion has an ultrasonic frequency of 15000-22000 Hz and a dispersion time of 20-25 min; and the filler is at least one selected from the group consisting of silicon dioxide, calcium carbonate and glass microsphere.

6. The elastic silicone cotton structure as claimed in claim 1, wherein each part of the coupling agent in parts by weight comprises 2-3 parts of (3-aminopropyl)trimethoxysilane, 0.5-2 parts of (γ-mercaptopropyl)trimethoxysilane and 2-3 parts of isopropyl tri(dioctylpyrophosphate) titanate; and the toughener is at least one selected from the group consisting of styreneic block copolymer, acrylonitrile butadiene styrene, and glycidyl methacrylate grafted with ethylene-octene copolymer.

7. An application method of an elastic silicone cotton structure as claimed in claim 3, comprising the steps of: coating an adhesive on an upper surface and/or a lower surface of a cotton body to form an elastic silicone cotton structure, and then attaching a material onto a surface of the adhesive surface to produce an elastic silicone cotton fabric; wherein the material is one selected from the group consisting of fabric, foam, fiber cotton, latex cotton, and sandwich cotton.

* * * * *